Figure 1:
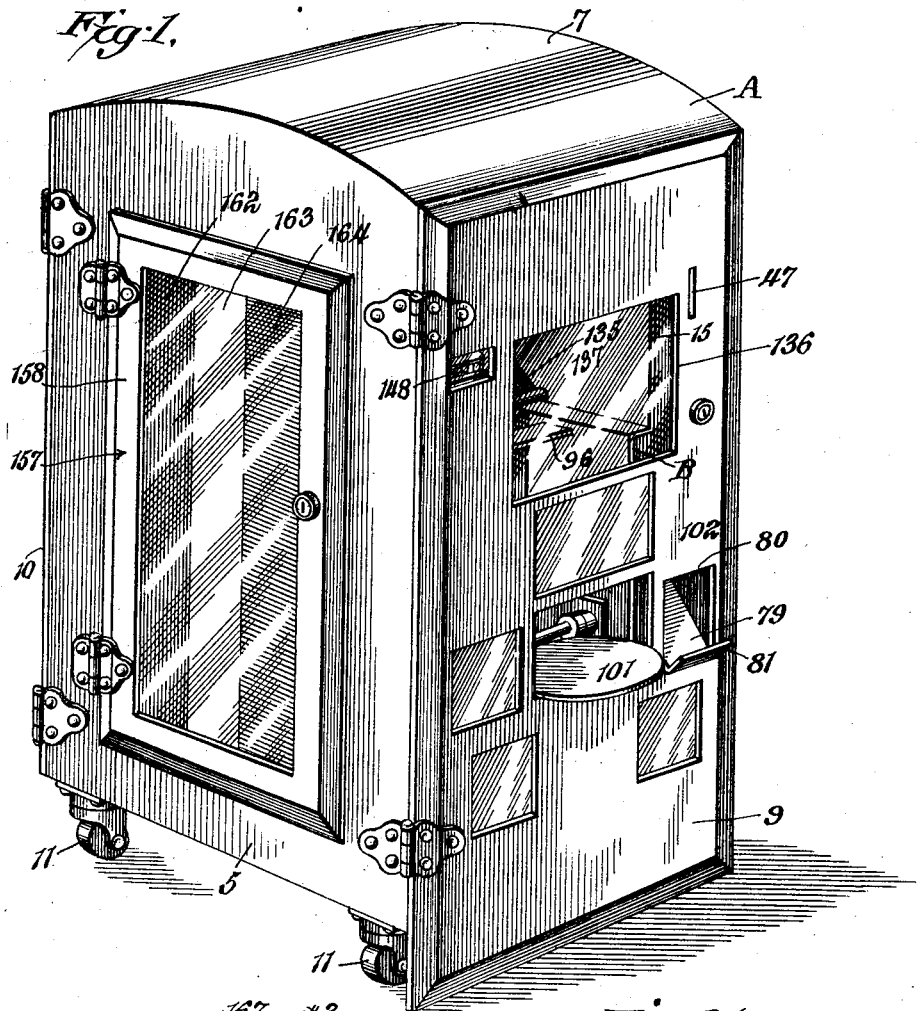

Dec. 24, 1929.  F. C. ROBERTS  1,741,000
COIN CONTROLLED VENDING MACHINE
Filed Dec. 8, 1928   10 Sheets-Sheet 1

Inventor,
Francis C. Roberts,
By Chas R. Allen
Attorney

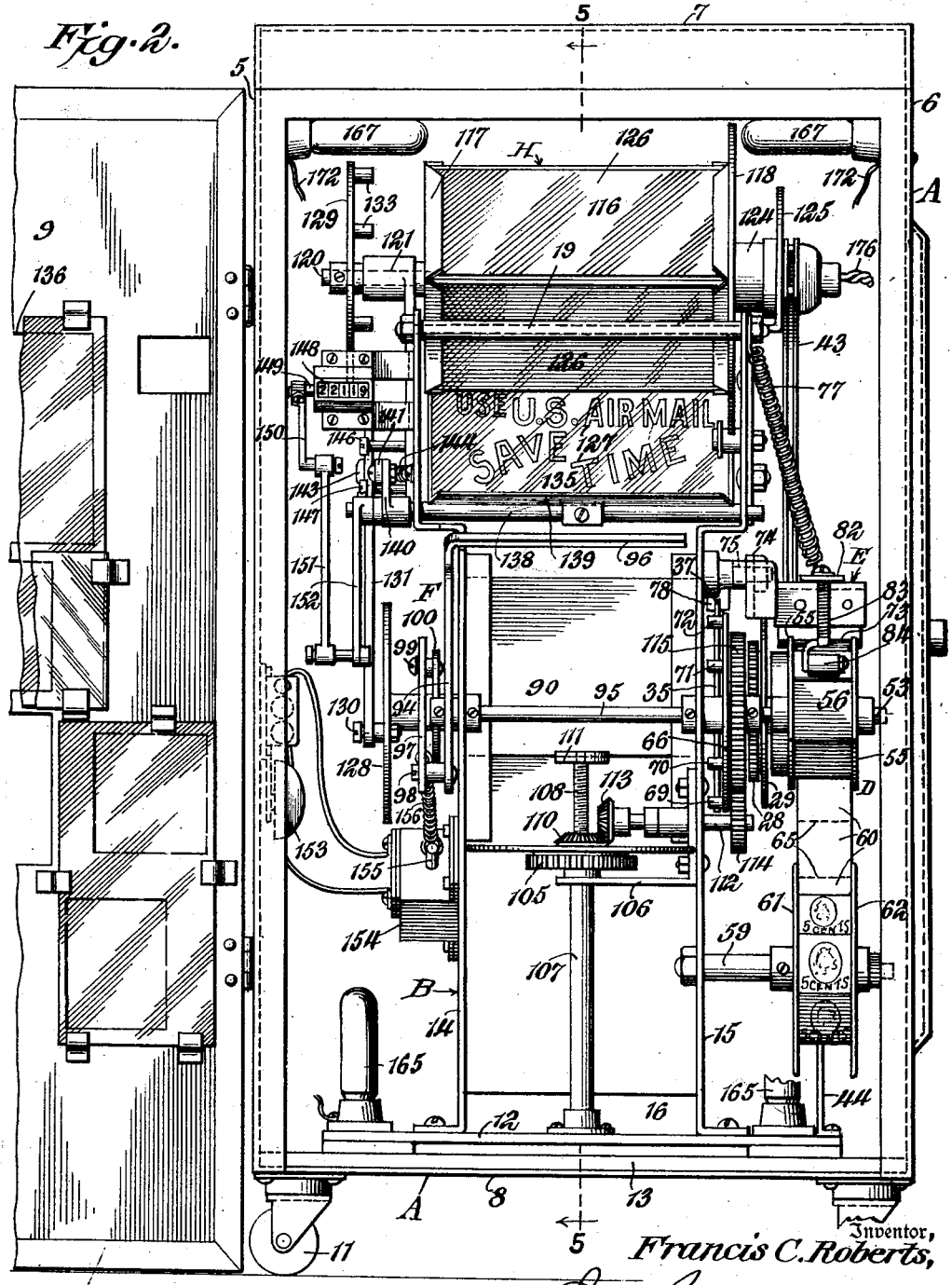

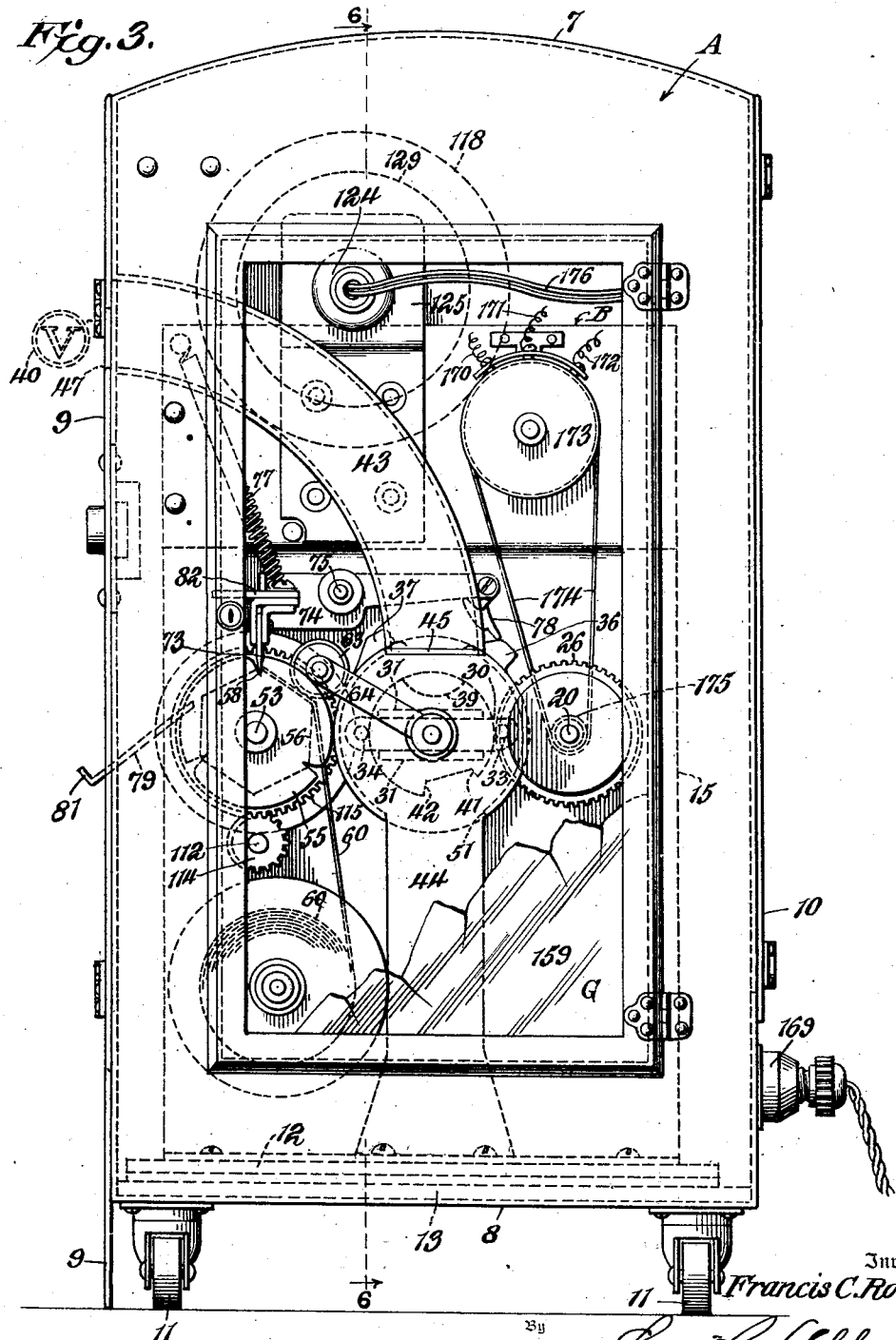

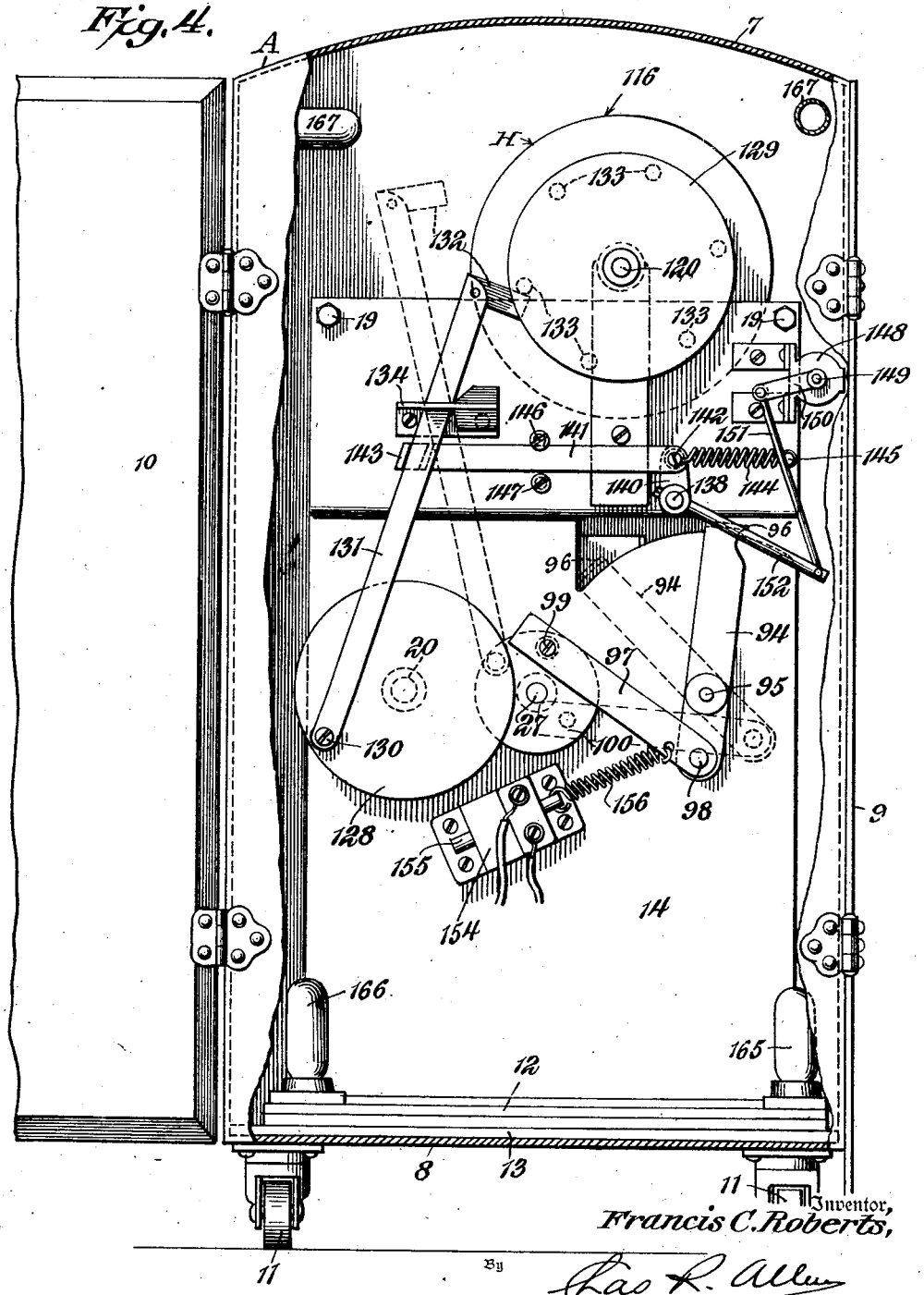

Dec. 24, 1929.  F. C. ROBERTS  1,741,000
COIN CONTROLLED VENDING MACHINE
Filed Dec. 8, 1928  10 Sheets-Sheet 5

Inventor
Francis C. Roberts,
By
Attorney

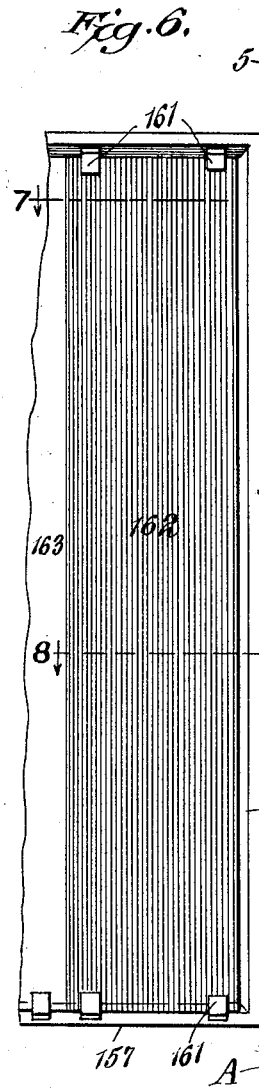
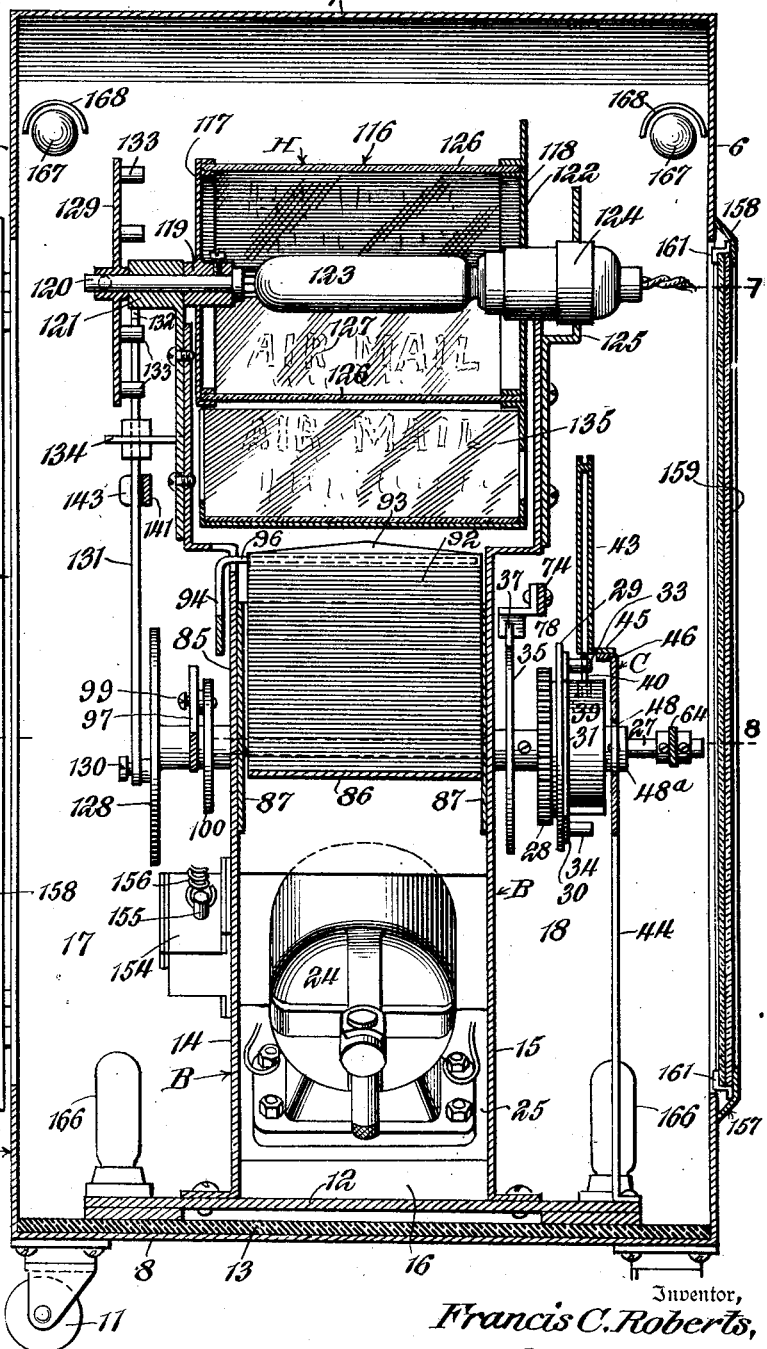
Fig. 6.

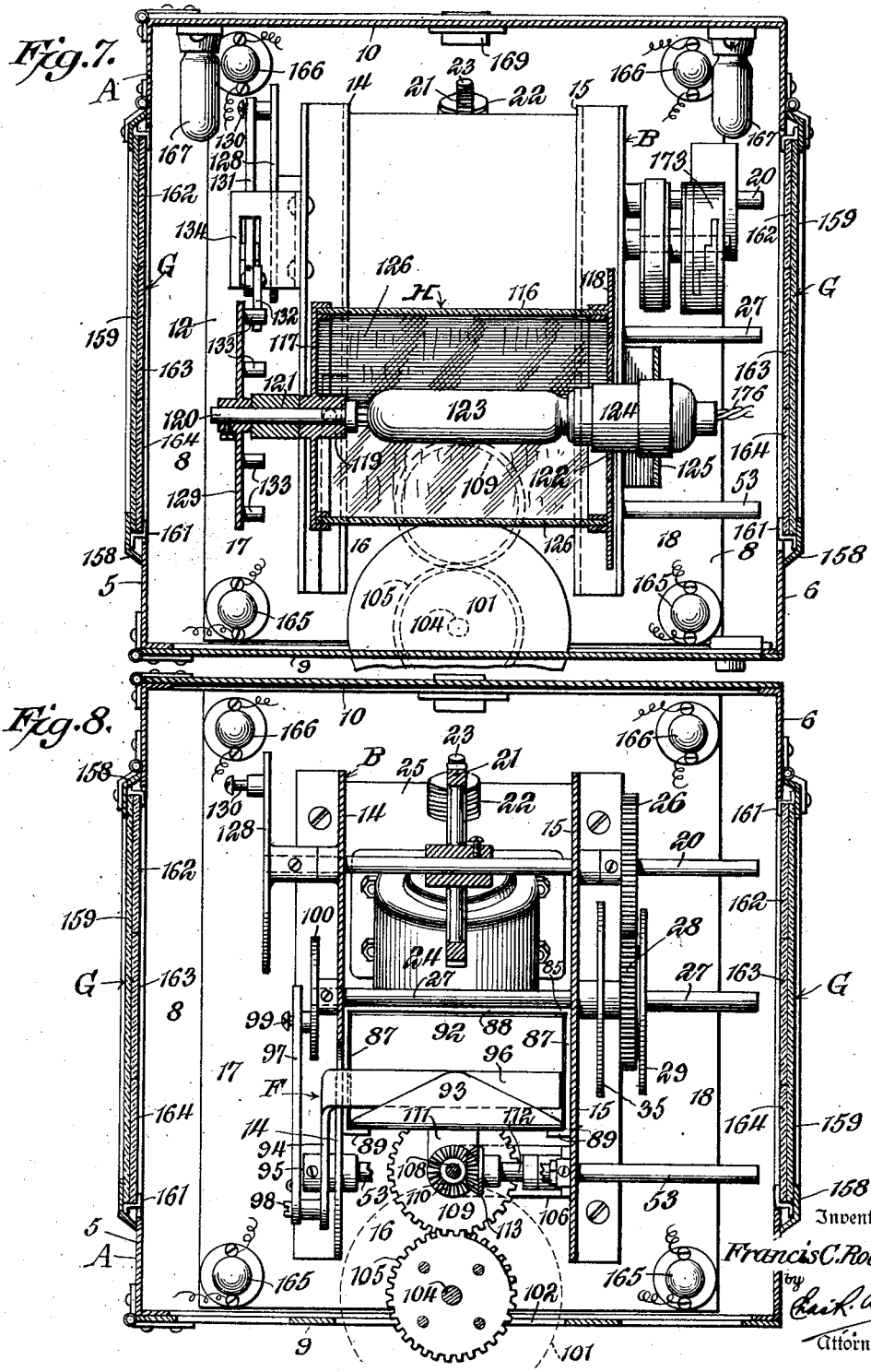

Dec. 24, 1929.　　　F. C. ROBERTS　　　1,741,000
COIN CONTROLLED VENDING MACHINE
Filed Dec. 8, 1928　　10 Sheets-Sheet 8

Inventor,
Francis C. Roberts,
By
Attorney

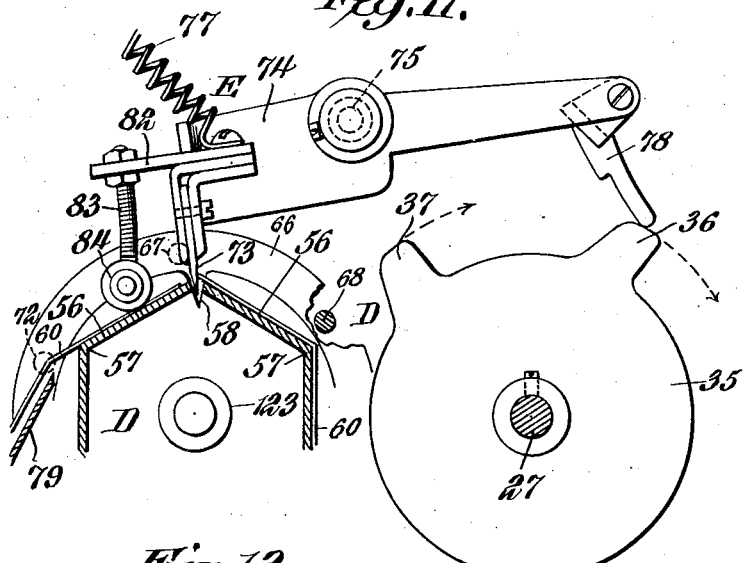

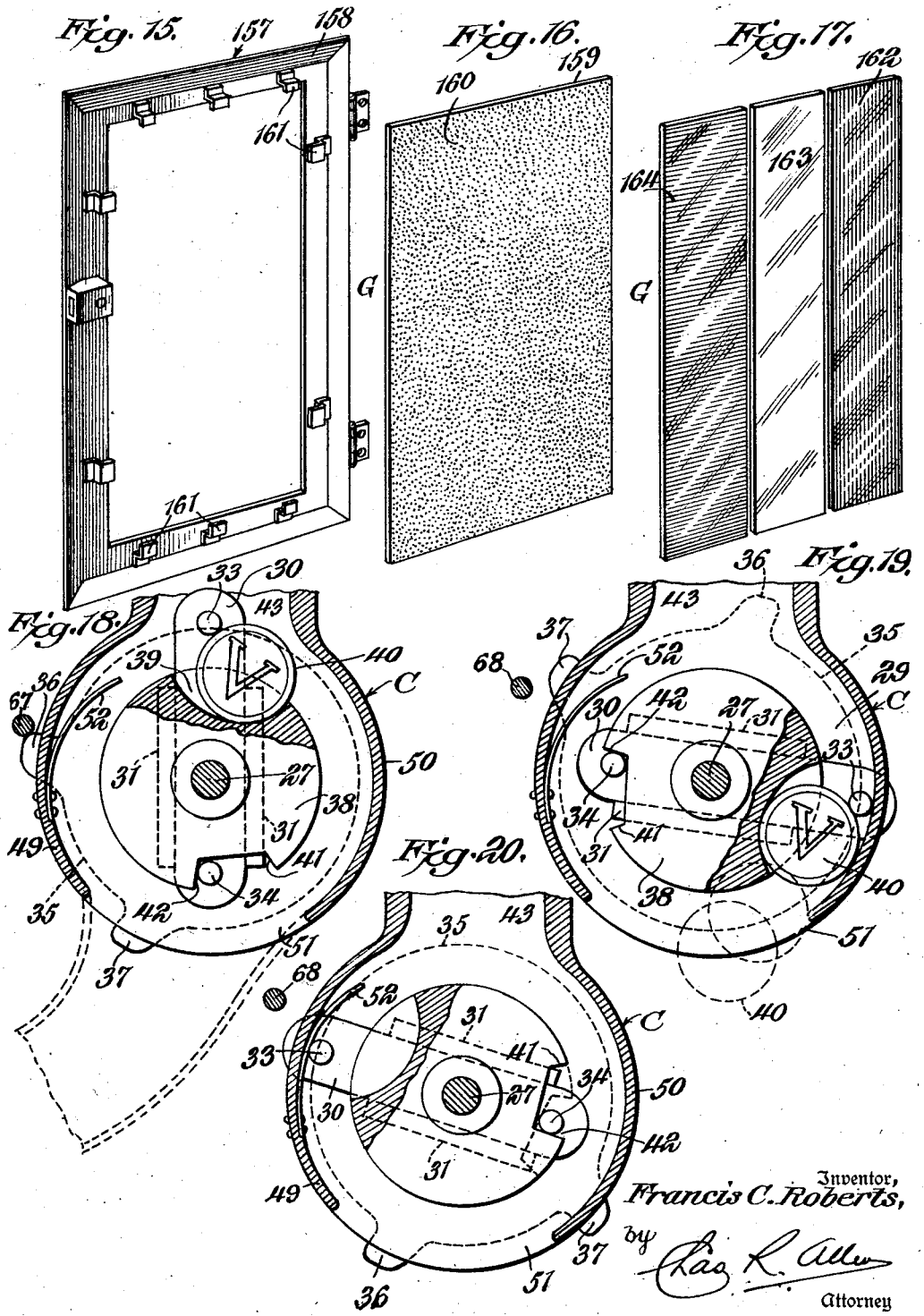

Patented Dec. 24, 1929

1,741,000

UNITED STATES PATENT OFFICE

FRANCIS C. ROBERTS, OF LOS ANGELES, CALIFORNIA

COIN-CONTROLLED VENDING MACHINE

Application filed December 8, 1928. Serial No. 324,603.

This invention relates to new and useful improvements in coin controlled vending machines generally, although the invention is more particularly directed to a coin controlled mechanism for delivering either one or more postage stamps, or an envelope, or both.

One of the principal objects of the invention is to provide a coin controlled stamp vending mechanism wherein upon insertion of a predetermined coin one or more stamps will be delivered to a purchaser.

Another object of the invention lies in the provision of a coin controlled stamp vending mechanism which will automatically feed one or more stamps from a strip of stamps, sever the predetermined number of stamps from the strip along the perforated line, and deliver the cut off stamp or stamps to the purchaser.

Another object of the invention is to provide a coin controlled envelope vending mechanism whereby upon insertion of a predetermined coin, an envelope will be removed from the top of a stack of envelopes and delivered to the purchaser.

Another object of the invention lies in the provision of a follower disposed below and supporting the stack of envelopes and means for automatically feeding the follower a distance equal to the thickness of the envelope during each envelope vending operation.

A further object of the invention lies in the provision of an intermittently rotatable table adapted to receive the vended or ejected envelope and to turn said envelope whereby one end thereof will be projected outwardly through an opening in the casing in order to permit the purchaser to readily grasp the extended end of said envelope.

Another object of the invention lies in the provision of a display mechanism which includes a plurality of elongated transparent plates positioned on a rotary drum, the plates being provided with suitable indicia whereby the latter may be read by the purchaser.

A still further object lies in the provision of a mirror arrangement adapted for the purpose of attracting purchasers to the machine, this arrangement including a mirror and a plurality of differently colored lenses immediately in rear thereof, together with a plurality of electric lamps which are adapted to be progressively thrown into circuit and thereby create different attractive effects to the mirror.

With these and other objects in view which will more fully appear, the nature of the invention will be more clearly understood by following the description, the appended claims, and the several views illustrated in the acompanying drawings.

Figure 21:
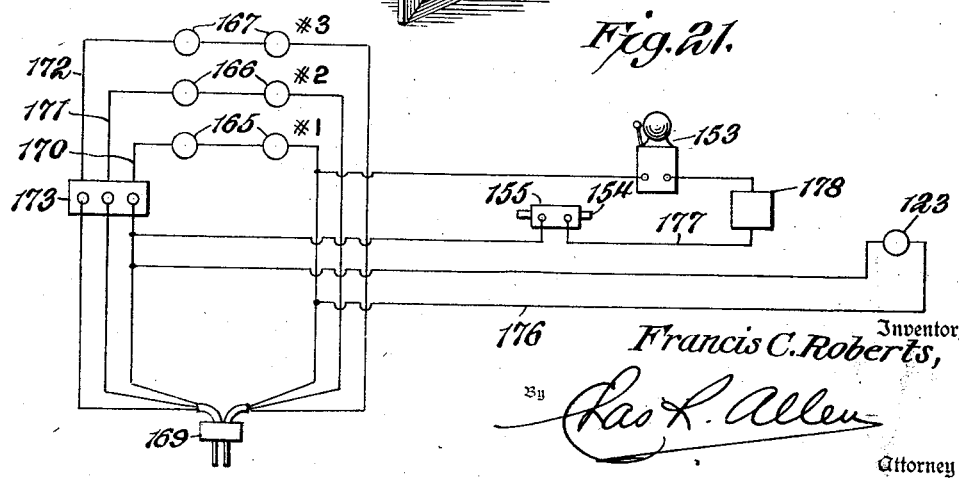
Figure 5:
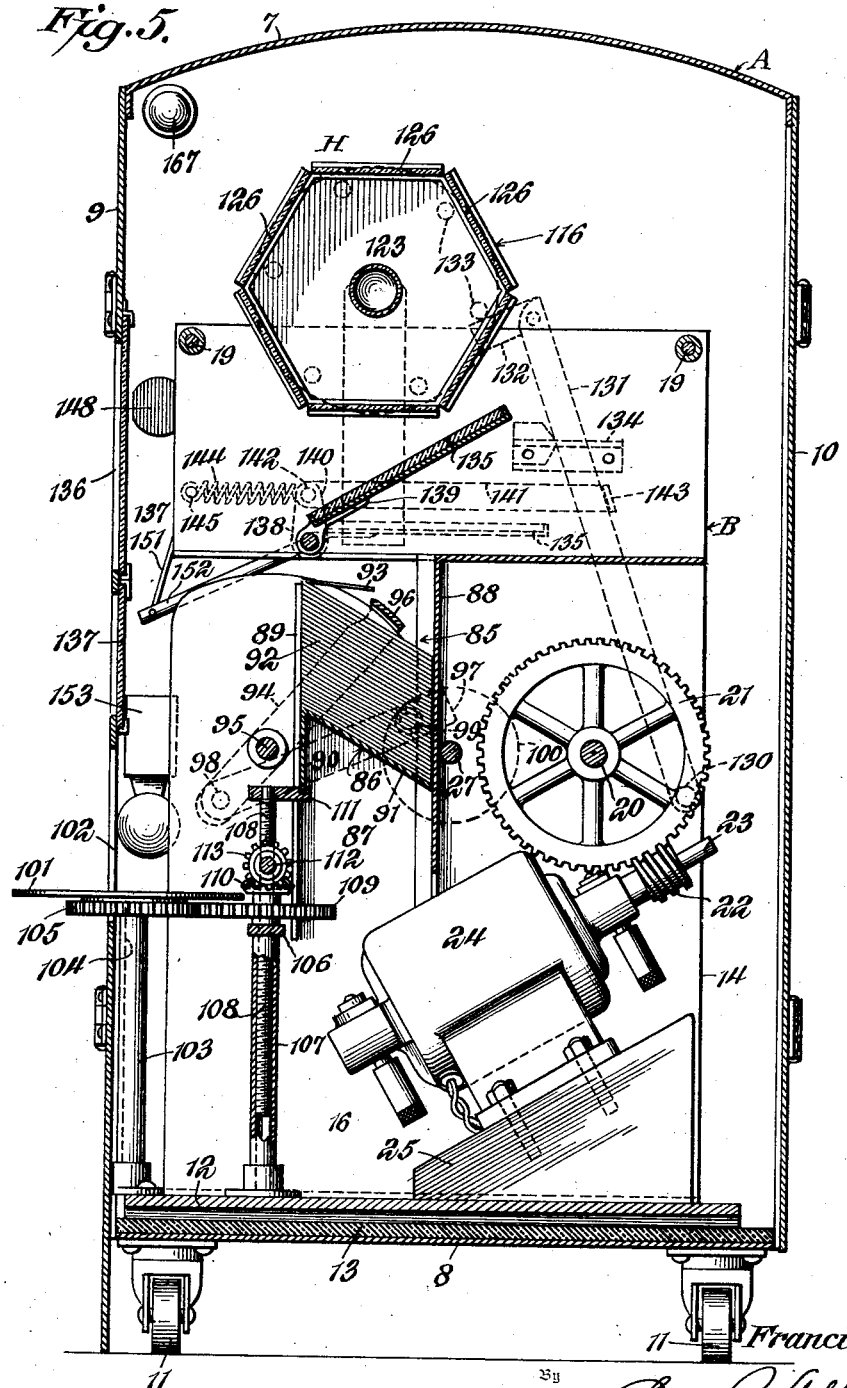
Figure 9:
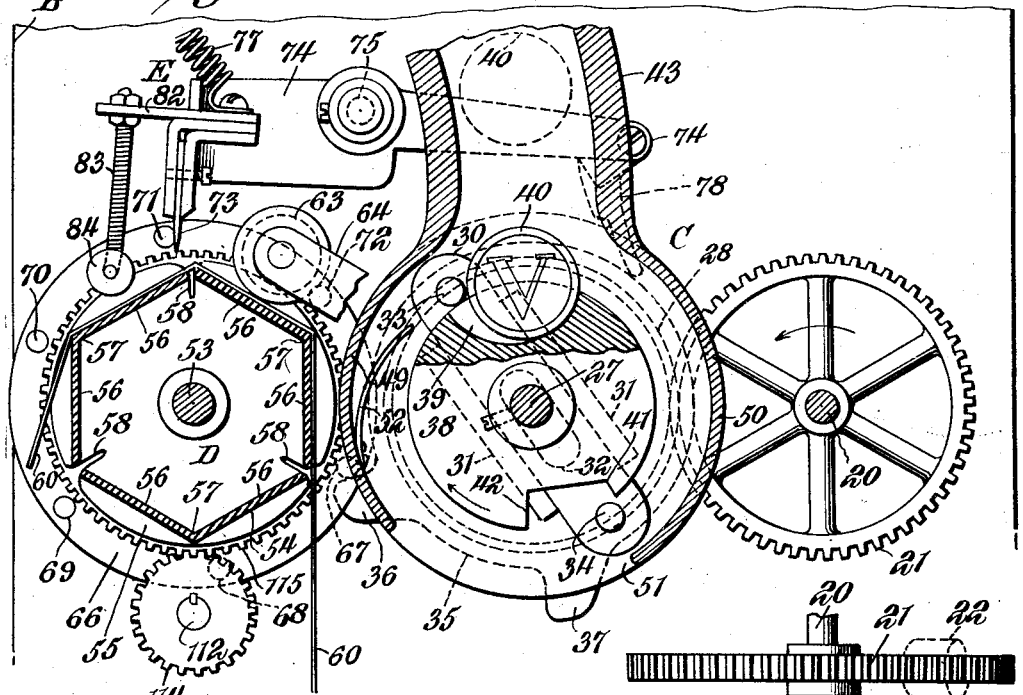
Figure 10:
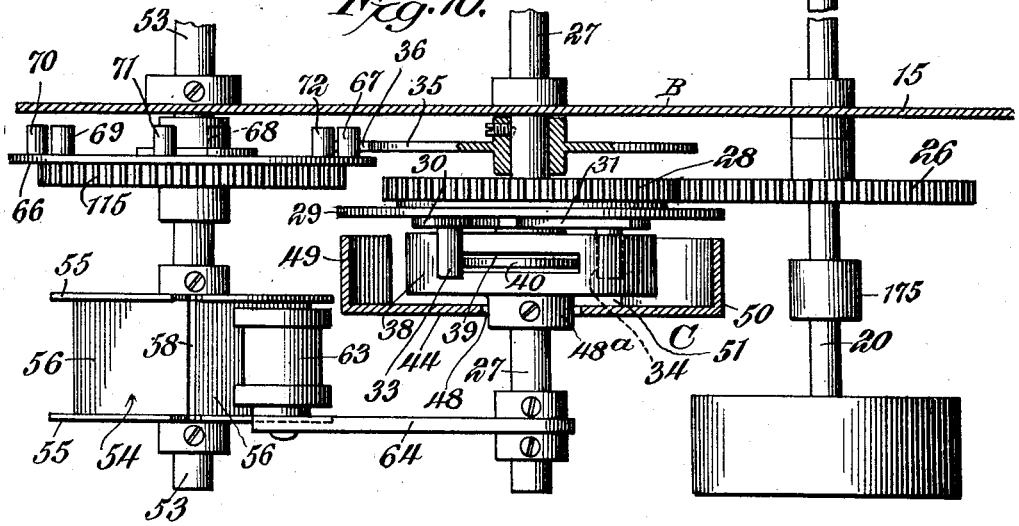

In the accompanying drawings which illustrate one form of my invention:

Figure 1 is a perspective view of a casing containing my improved vending mechanism, display mechanism and mirror construction, Figure 2 is a front elevation thereof, the front door being shown open to better disclose the interior mechanism, Figure 3 is a side elevation of the right hand side of the machine showing particularly the coin controlling mechanism and the stamp feeding mechanism, Figure 4 is a vertical sectional view showing the mechanism on the left hand of the machine, Figure 5 is a vertical sectional view taken on the line 5—5 of Figure 2, Figure 6 is a vertical sectional view taken on the line 6—6 of Figure 3, Figure 7 is a horizontal sectional view taken on the line 7—7 of Figure 6, Figure 8 is a horizontal sectional view taken on the line 8—8 of Figure 6, Figure 9 is an enlarged detail view showing the coin controlled mechanism, the stamp feeding means and the stamp cutting means, the view showing the coin carrier in its normal or coin receiving position, Figure 10 is a horizontal sectional view taken through the lower end of the coin chute and in a plane directly above the coin carrier and the stamp feeding drum, Figure 11 is an enlarged detail view showing the actuating means for the stamp cutter, Figure 12 is a vertical section showing the means of mounting the slide arm of the coin controlled clutch mechanism on a constantly rotating disc, Figure 13 is a sectional view taken on the line 13—13 of Figure 12, Figure 14 is a detail vertical sectional view taken in the plane of the coin chute and showing the relation between the chute, the front door of the casing, and the coin carrier, Figure 15 is a perspective view of the hinged casing for supporting the mirror and the plurality of differently colored lenses, Figure 16 is a perspective view of the mirror, Figure 17 is a perspective view of the differently colored lenses, Figure 18 is a sectional view of the coin controlled mechanism, the view showing the slide arm in position after the coin carrier has been moved a predetermined distance through the medium of an inserted coin, the view also showing the pin on the lower end of a radially movable arm in its initial position of engagement with a shoulder on the coin carrier, Figure 19 is a similar view but showing the position of the parts immediately prior to the coin being released from its carrier, Figure 20 is a view similar to Figure 19 but showing the arm in position just prior to it being released from the coin carrier, and Figure 21 is a diagrammatic view of the electrical circuit employed with my invention.

Like reference numerals designate corresponding parts throughout the several figures of the drawings.

The invention generally comprises a casing which is indicated as a whole by the reference character A, a supporting frame B, a coin controlled mechanism C, a stamp feeding mechanism D, a stamp cutting mechanism E, an envelope delivery mechanism F, a mirror construction G, and a display mechanism H.

The casing A includes side walls 5 and 6, a top 7, bottom 8, a front door 9, a rear door 10, and supporting rollers 11.

The supporting frame B which is disposed within the casing A, consists of a base 12 which is supported on the bottom 8 of the casing through the medium of a pad 13 of suitable insulating material. Attached to the base 12 of the frame and extending upwardly therefrom are standards or side plates 14 and 15 forming therebetween a centrally located space 16, and forming on opposite sides of said plates and between the side walls 5 and 6 of the casing, side spaces 17 and 18 respectively. The side plates 14 and 15 are connected at various points by tie bolts 19.

Journaled in bearings carried by the side plates 14 and 15 is a main shaft 20 and fixed to this shaft within the central space 16 is a worm wheel 21 which is driven by a worm 22 fixed on an armature shaft 23 of a motor 24 fixed to an inclined block 25 mounted on the base 12 of the frame B. The main shaft 20 has one end extending into the space 18 and has a gear 26 fixed thereon. A countershaft 27 arranged in parallelism with the main shaft 20, is also journaled in bearings carried by the side plates 14 and 15. One end of this countershaft 27 also projects within the space 18 and movably journaled on this shaft is a driven gear 28 which is always in mesh with the driving gear 26. The motor 24 is intended to rotate constantly, and consequently the main shaft 20 through the gear 26 will constantly rotate the gear 28 on the countershaft 27, but the countershaft 27 will not be rotated until a clutch mechanism, which will be hereinafter described, has been thrown into operation. Fixed to the gear 28 to rotate therewith is a disc 29 and a clutch bar 30 is supported on the outer face of the disc 29 for radial sliding movements between a pair of guide plates 31, 31. The bar 30 is formed with an elongated slot 32 which embraces the shaft 27 so as to permit lengthwise sliding movements of the bar 30 in either direction. Fixed to the outer face of the slide bar 30 and located adjacent the respective ends thereof, are laterally extending clutch pins 33 and 34, the longitudinal axes of said pins being in parallelism with the countershaft 27. Fixed to the countershaft 27 and located between the gear 28 and the side plate 15 is a cam disc 35 having two cam fingers 36 and 37 extending radially from the periphery thereof and spaced apart a predetermined distance. Also fixed to the countershaft 27 and located on the side of the disc 29 opposite the cam disc 35 is a coin carrier 38 which is generally circular in outline, the diameter of the carrier being slightly less than the distance between the clutch pins 33 and 34, thereby permitting said clutch pins to project laterally over the periphery of said carrier. Formed in the coin carrier 38 and extending inwardly from the periphery thereof, is a recess 39 for receiving a coin 40 of a predetermined value. The depth of the recess 39 is such as to cause approximately the upper half of the coin to project beyond the periphery of the carrier, as shown particularly in Figures 9, 18 and 19. It will be observed that the coin receiving recess 39 extends generally in the plane of the carrier, and the width of the recess is slightly larger than the thickness of the coin. Also formed in the carrier 38 at a point nearly diametrically opposite the coin receiving recess 39, is a radially extending cut-away portion or recess 41 forming a resultant shoulder 42.

The clutch slide bar 30 constantly rotates with the driven gear 28 and consequently when the clutch bar is connected or clutched to the coin carrier 38, said carrier together with the shaft 27 and the cam disc 35 will be rotated with the gear 28.

A coin chute 43 is disposed within the space 18 of the supporting frame B. This chute 43 is supported at its lower end on a standard 44 through the medium of connecting flanges 45 and 46 which are located at the bottom of the chute 43, one of the flanges being carried by the chute and the other by the standard. The upper end of the chute 43 is positioned to register with an opening 47 formed in the front door 9 of the casing, and the lower or egress end of the chute is positioned directly above the coin carrier 38 and in position for registration with the coin receiving recess 39 which is normally disposed directly below the chute for receiving a coin therefrom. The upper end of the standard 44 is provided with an opening 48 for receiving the shaft 27 and the attaching hub 48ᵃ of the coin carrier 38. The upper portion of the standard 44 is preferably enlarged and shaped to form a circular head of a diameter greater than the diameter of the coin carrier 38. This head is provided on opposite sides with rearwardly extending flanges or walls 49 and 50 respectively. These walls are disposed on opposite sides of the shaft 27 and are curved about arcs of similar radii having the axis of the shaft 27 for their centers. The wall 50 is spaced from the periphery of the coin carrier 38 a distance sufficient to permit of the coin 40, while in its recess 39, being moved downwardly upon rotation of the carrier to a discharge opening 51 located between the walls 49 and 50. The inner edges of the walls 49 and 50 are spaced from the disc 29 a distance sufficient to permit the end of the clutch arm 30, which carries the clutch pin 33, projecting beyond said walls. A flat spring 52 is disposed against the inner face of the wall 49 and has its lower end riveted to said wall. The spring 52 functions to assist gravity in moving the clutch bar 30 in a direction to free the clutch pin 34 from the shoulder 42, as viewed in Figure 20.

A second countershaft 53 is journaled in suitable bearings carried by the side plates 14 and 15 and one end of this shaft projects into the space 18. Fixed to this projecting end of the shaft 53 is a stamp feeding drum 54. This drum is provided with a multiple faced periphery and with side flanges 55, 55, each of the faces being flat and being indicated by the numeral 56. Preferably I employ six of these faces 56, and the lengths of the faces are uniform. As a result of this construction, each pair of adjacent faces 56 form a resultant apex 57, and alternate apices are formed with inwardly extending radially disposed slots 58. Disposed below the countershaft 53 is a stub shaft 59 which is secured at one end to the side plate 15. Loosely supported on the shaft 59 directly below the stamp feeding drum 54 is a roll of postage stamps 60 arranged in strip formation. The roll is held against lateral movement on the shaft 59 through the medium of a disc 61 which is fixed to the shaft, and by a spaced disc 62 which is freely mounted on said shaft. By freely mounting the disc 62 on the shaft, the stamps may be unreeled with a minimum amount of resistance. The free end of the strip of stamps is led upwardly onto the stamp feeding drum 54. The length of each face 56 of the stamp feeding drum 54 is equal to the length of a stamp 60. The lead in end of the stamp strip is initially positioned on the drum 54 with the first stamp on the flat face 56 located directly in rear of a recess 58 and a roller 63 bears against said stamp to hold the lead in end in the position described. This roller 63 is journalled on an arm 64 which is freely pivoted on the countershaft 27 so as to permit the roller 63 to bodily move upwardly by reason of the apices 57 being rotated thereunder. It will furthermore be noted that the lines of perforation 65 of the strip of stamps will register with the apices 57 and consequently every other line of perforation will register with the recesses 58 which are located in alternate apices.

Fixed to the countershaft 53 which supports the stamp feeding drum 54 is a disc 66 having a plurality of pins 67, 68, 69, 70, 71, and 72 extending laterally from one face thereof, and in a general plane containing the cam disc 35. These pins 67 to 72 inclusive are disposed in spaced relation adjacent the periphery of the disc 66. Inasmuch as the stamp feeding drum 54 is provided with six flat faces 56 and with six apices 57, the pins 67 to 72 are also six in number and are spaced equidistant apart and at uniform distances from the axis of the shaft 53.

Thus the pins 67 to 72 are respectively spaced apart a distance substantially equal to the distance between the cam fingers 36 and 37. Consequently during each rotation of the cam disc 35, the cam fingers 36 and 37 will successively engage two of the pins on the stamp drum and rotate said drum two steps, that is, a distance equal to the length of two stamps on said drum. The second cam finger 37 will then be moved away from the drum fingers and consequently the stamp drum will come to a state of rest with the line 65 of perforations between the second and third stamps on the apex 57 at the top of the drum.

In order to sever these two stamps, I have provided a cutting mechanism which includes a cutter blade 73 fixed to the forward end of a lever 74 which is pivoted as at 75 to the vertical standard or plate 16. The cutting blade 73 oscillates in a substantial vertical plane and its lower or cutting edge is projected into a longitudinally extending groove 58, there being one of said grooves formed in every other apex 57 of the stamp drum. The forward end of the lever 74 is yieldably held above the drum by a spring 77 which is connected at one end to the lever 74 and at the other end to the standard 15. The other end of the lever 74 is provided with a depending arm 78 adapted to be successively engaged by the cam fingers 36 and 37 immediately following the rotation of the stamp drum by said cam fingers. When the fingers 36 and 37 successively contact the arm 78, the cutter blade 73 will be actuated two times while the stamp drum is stationary, and consequently these two cutting operations will insure the two stamps which have been previously fed to the top of the drum, being severed.

After the two stamps have thus been severed, they drop by gravity onto an inclined chute 79 which is supported by the front door 9 and extends forwardly through an opening 80 formed in said door, the forward end of the chute being preferably provided with an upstanding flange 81 to retain the severed stamps in position whereby the purchaser may readily remove the same from the chute 79.

In order to assist the severed stamps in moving down the chute 79, I have provided a stamp pushing device which is carried by the lever 74 whereby upon the completion of the severing operation, said pusher device will engage the severed stamps and give to them a pushing action which will direct said stamps onto the chute 79. For this purpose, the lever 74 is provided with a forwardly extending arm 82, and attached to the forward end of this arm is a downwardly extending coil spring 83 having a roller 84 journaled on its lower end for engagement with the severed stamps. It will be observed that the roller 84 cooperates with the front flat face 56 of the stamp drum, and that this face during the cutting operation is inclined downwardly. Therefore, as the lever 74 descends the roller 84 will engage the stamp and the roller will be flexed forwardly due to the spring 83, and consequently the severed stamps will be assisted in their downward movement onto the chute 79.

In operation, as thus far described, the purchaser first places a coin of predetermined size and value in the coin opening 47. This coin gravitates down the coin chute 43 and becomes seated in the coin recess 39 of the coin carrier 38. It will be remembered that the main shaft 20 is being continuously rotated and consequently the clutch bar 30 will be constantly rotated around the stationary coin carrier 38. During the rotation of the clutch bar 30, the pin 33 of said clutch bar will engage the coin 40, force the coin rearwardly against the rear wall of the recess 39, and thereby bring about the initial rotation of the coin carrier 38. During this initial rotation of the carrier, the clutch bar 30 will be moved radially due to the pin 33 thereof climbing the coin 40, as shown more particularly in Figure 18. This radial movement of the clutch bar 30 will cause the pin 34 thereof to be moved into the recess 41 of the carrier and abut the shoulder 42 thereof. The continued rotation of the clutch bar 30, through the pin 34 and shoulder 42, will continue to rotate the coin carrier 38. As the coin 40 is moved around to the Figure 19 position, the coin will be held against dropping out by reason of the wall 29. Immediately after the carrier 38 reaches the Figure 19 position, the coin will gravitate through the opening 51. Although, the coin has thus been dropped, the pin 34 remains in driving contact with the shoulder 42 and consequently the carrier is further rotated. During this further rotation of the carrier, the pin 33 contacts with the flat spring 52, as shown in Figure 20, and as a result the spring cooperating with the pin 33 assists gravity in moving the clutch bar 30 in the opposite radial direction so as to disengage the pin 34 from the shoulder 42, thereby bringing the coin carrier 38 to a position of rest wherein the coin recess 39 is at the top of the carrier and in position to receive the next coin dropped into the chute 43. Inasmuch as the cam disc 35 and the coin carrier 38 are fixed to the shaft 27, it will be apparent that the cam disc will rotate intermittently and in unison with the coin carrier 38. Thus as the coin carrier 38 is rotated the cam fingers 36 and 37 will successively engage two of the pins 67 to 72 of the stamp drum and thereby rotate said drum for two spaces as previously described. After the stamps have thus been fed, the drum comes to a state of rest and the cam disc 35 continues to rotate whereby the fingers 36 and 37 will successively operate the stamp cutting lever 74 and thereby effect the complete severing of the two end stamps. Simultaneously with these cutting actions, the roller 84 of the stamp pushing means will engage said stamps and push the same onto the delivery chute 79. Immediately after the cutting operation, the spring 52 causes the clutch bar 30 to be moved radially in opposite directions, as previously described, so as to bring the carrier and the cam disc 35 to a state of rest and in position to begin another cycle of operation.

My invention further comprises a coin controlled envelope vending mechanism whereby upon the insertion of a coin of predetermined value, an envelope together with a predetermined number of stamps will be simultaneously ejected. To this end, I have provided the following mechanism.

This envelope delivery mechanism, which I have indicated as a whole by the reference character F, includes an envelope container which comprises a frame 85 and a follower 86. The frame 85 includes spaced side walls 87, 87 which are fixed to the uprights 14 and 15, and a rear wall 88, the side walls being provided along their front edges with inwardly extending flanges 89, 89. The frame 85, therefore, has an open top and an open bottom. The follower 86 comprises a front wall 90 having at its lower end a rearwardly and downwardly inclined supporting plate 91 for the stack of envelopes 92, said envelopes being arranged in superposed relation in a vertical column or stack formation. Preferably these envelopes are arranged face downwardly so as to position the flaps 93 thereof in a plane arranged at an angle to the plane of the envelope, as shown particularly in Figure 5. In order to eject the uppermost envelope of the stack, I have provided an actuating lever 94 which is pivoted intermediate its ends as at 95 to the outer face of the standard 14. The upper end of the lever 94 carries a laterally extending envelope engaging finger 96 which is adapted to oscillate and to successively engage under the flaps 93 of the envelopes and thereby project said envelopes forwardly of the frame 85. In order to oscillate the lever 94 and thereby successively eject the envelopes, I have connected the lower end of said lever to a link 97 through the medium of a pivot 98. The other end of the link 97 is pivotally connected to an eccentric pin 99 fixed to a disc 100 which in turn is fixed to the countershaft 27. Thus when the countershaft 27 is positively and intermittently rotated through the medium of a cam disposed in the coin carrier 38, the lever 94 will be actuated and an envelope ejected forwardly of the frame 85.

As an envelope 92 is thus forwardly projected, said envelope is swung downwardly by the finger 96, after which the envelope drops to gravity onto a table 101 which is horizontally disposed and projects through an opening 102 formed in the front door 9. As the envelope thus falls onto the table 101, it is positioned within the machine frame and with its major axis parallel with the front door. It is therefore desirable to intermittently rotate the table 101 so as to partially rotate the envelope and thereby project one end portion thereof outwardly through the opening 102 so as to permit the purchaser to easily grasp the same. For this purpose, I have supported the table 101 upon a vertically disposed hollow standard 103 and a stem 104 is mounted within the tubular standard for rotary movements. A gear 105 is fixed to the stem whereby upon rotation of the gear the table 101 will be correspondingly rotated. In order to drive the gear 105, I have attached a bracket 106 to the inner face of the standard 16. A vertically disposed tube 107 has its lower end secured to the bottom plate 12 and has its upper end passing through an opening in the outer end of the bracket 106. A threaded screw 108 is mounted within the tube 107 and threaded onto this screw 108 is a gear coupling comprising a gear 109 which is in mesh with the gear 105 and a bevel gear 110. Thus when the bevel gear 110 is rotated, the table 101 will be correspondingly rotated, and simultaneously therewith the screw 108 will be moved upwardly. The upper end of the screw 108 is loosely connected to a horizontally disposed arm 111 which engages the front wall 90 of the follower and thereby supports the latter. Thus when the screw 108 is moved upwardly, the follower will be likewise moved upwardly. A horizontally disposed countershaft 112 is journaled in the standard 15 and carries at its inner end a bevel gear 113 which is in mesh with the bevel gear 110. Fixed to the outer end of the countershaft 112 is a gear 114 which is in constant mesh with a driving gear 115 fixed to the countershaft 53.

Consequently when the countershaft 53 is actuated through the medium of a deposited coin, the envelope table 101 will be given two successive movements in a rotary direction, due to the cam fingers 36 and 37 cooperating with the stamp drum fingers 67 to 72, and thereby imparting two successive rotary movements to the countershaft 53. Simultaneously with the delivery of an envelope onto the table 101, the stack of envelopes will be elevated a distance equal to the thickness of an envelope through the medium of the screw 108.

From the foregoing, it will be observed that when a coin is deposited, a predetermined number of stamps will be delivered and an envelope will be delivered simultaneously therewith.

My display mechanism H includes an intermittently rotatable drum which is indicated as a whole by the reference numeral 116. This drum includes a pair of end plates 117 and 118. The end plate 117 is provided with a hub 119 which is fixed to a shaft 120 journaled in a bearing 121 mounted on the upper end of the standard 14. The end plate 118 is provided with a concentrically disposed opening 122 through which projects a stationary electric lamp 123, said lamp including a socket 124 which is fixedly supported in a bracket 125 attached to the standard 15. Attached to the end plates 117 and 118 is a plurality of glass or other transparent plates 126. One face of each plate 126 is provided with advertising or other data which I have indicated at 127. This data may be in the form of printed letters or otherwise. Thus when the lamp 123 is illuminated, the data 127 will be clearly displayed.

In order to intermittently rotate the drum

116, I have fixed to the main shaft 20 a disc 128, and have fixed to the drum shaft 120 a disc 129. Fixed to the drive disc 128 is an eccentrically located pin 130 to which the lower end of a lever 131 is pivotally connected. The upper end of the lever 131 is provided with a rearwardly extending arm 132 which is adapted to successively engage a plurality of pins 133 which are fixed to the disc 129 and are spaced equal distances apart. The pins 133 are arranged in a circle concentric with the shaft 120 and there are as many of the pins as there are plates 126 on the drum. A bracket 134 is attached to the upper end of the standard 14 below the disc 129 and this bracket is provided with an opening through which the lever 131 extends and cooperates with the wall of said opening to form a sliding fulcrum for the lever. Consequently when the drive disc 128 is being rotated, the lever 131 will not only be oscillated but will be moved endwise so as to intermittently and successively engage the pins 133 and thereby intermittently rotate the display drum 116. It will be understood that after the drum has been rotated a distance equal to the distance between a pair of pins 133, the drum will cease rotating while the lever 131 makes its next movement. Therefore, the display drum 116 is rotated in a manner to impart intermittent periods of rotation and alternate periods of rest thereto.

As above stated, the display drum 116 is intermittently rotated and consequently the plates 126 will be successively positioned at the bottom of the drum, or in the position shown particularly in Figure 5. When each plate 126 is thus positioned at the bottom of the drum, it is obvious that a person standing in front of the apparatus can not view the indicia 127 on said plate. In order to permit a person to view such indicia on the bottom plate, I have provided a mirror 135 which is mounted for oscillatory movements, the mirror being positioned at an inclination to the horizontal when the associated plate 126 is at the bottom of the drum and is in position of rest. When the drum is being intermittently rotated, the mirror 135 will be moved downwardly into a horizontal plane, and when the drum ceases to rotate the mirror will be elevated to the inclined position above noted so as to project the reading matter from the plate 126 forwardly through an opening 136 formed in the front door 9 of the machine, said opening being preferably covered by a glass or other transparent plate 137. The mirror 135 is supported on a rock shaft 138 through the medium of a bracket 139 which is fixedly connected to the mirror and to the shaft. The shaft 138 is journaled in the side plates or uprights 14 and 15. One end of the shaft 138 projects beyond the upright 14 and fixed to the projecting end of this shaft is a rock arm 140. A link 141 is pivotally connected at its forward end as at 142 to the rock arm 140 and the rear end of this link 141 is provided with a laterally extending finger 143 which engages the lever 131. A coil spring 144 is connected at one end as at 145 to the standard 14 and at its other end to the rock arm 140 through the medium of the pivotal connection 142. The spring 144, therefore, functions to yieldably retain the finger 143 in engagement with the lever 131. Consequently when the lever 131 is moved from one side to the other, as viewed in Figure 4, the link 141 will be moved endwise so as to oscillate the shaft 138 and thereby oscillate said mirror 135. In order to guide the link 141 in its endwise movements, I have provided upper and lower flanged rollers 146 and 147 respectively, as shown in Figure 4.

In the operation of this mirror 135, assuming the parts to be in the Figure 4 position, the rotation of the disc 128 in a clockwise direction will move the lever 131 upwardly in a lengthwise direction until the eccentric pin 130 has about reached a point directly above the main shaft 20. During this movement of the lever 131, the arm 132 through its engagement with one of the pins 133 of the display drum 116 will rotate said drum the required step. Upon further rotation of the disc 128, the lever 131 will be moved away from the pin 133, or to the dotted line position of the lever 131 as shown in Figure 4. Thus during the rotation of the display drum 116, the lever 131 will be moved in a lengthwise direction and substantially no endwise movement will be permitted to be given to the link 141, and therefore the rock shaft 138 to which the mirror 135 is connected, will not be oscillated. As soon, however, as the lever 131 begins to oscillate to its dotted line position shown in Figure 4, the spring 144 will bring about a rocking movement to the rock shaft 138 and consequently the mirror 135 will be elevated. Therefore, the mirror 135 will remain stationary in a horizontal plane during the step rotation of the display drum 116 and will be moved to an inclined position during the first oscillation of the lever 131 and will remain in said inclined position during substantially the entire period the drum 116 is at rest.

This machine is intended to be rented to a customer and it is therefore desirable to know the number of times the various plates 126 are displayed. To this end, I have provided a counter 148 of the rotary type which includes an actuating shaft 149. The counter 148 is suitably supported on the frame of the machine. Fixed to the shaft 149 is a rock arm 150 and to this rock arm is pivotally connected one end of a link 151, the other end of said link being pivotally connected to a rock arm 152 which is fixed to the mirror supporting shaft 138. Thus it will be observed that the mirror is actuated in unison with the intermittent movements imparted to the display drum 116, and consequently each time the indicia on the respective plates 126 is projected forwardly by assistance of the mirror 135, such operation will be recorded by the counter 148.

It is also desirable to employ a signal, preferably of the audible type, which will be automatically operated each time an envelope is ejected. To this end, I have provided a bell 153 which is connected through an electrical circuit, hereinafter described, with a switch 154, said switch being of the conventional type and including a movable contact rod 155 which is normally out of contact with fixed contacts arranged within the switch. A spring 156 is connected at one end to the contact rod 155 and at its other end to the link 97 of the envelope ejecting mechanism, as shown particularly in Figure 4. Thus whenever the link 97 is moved endwise the spring 156 will move the contact rod 155 to close the circuit and thereby ring the bell.

Each of the sides 5 and 6 of the casing A is provided with an opening which is closed by a hinged door 157, and inasmuch as these door constructions are identical, the description of one only will be given. Each door 157 includes a rectangular frame 158 which supports a mirror 159. This mirror instead of having a backing of quicksilver, is provided with a backing of varnish 160 or other suitable backing which under certain light conditions is transparent. The mirror is held within the rectangular frame 158 by marginal clips 161. Disposed in rear of the mirror 159 is a plurality of vertically disposed and differently colored transparent lenses 162, 163 and 164, said lenses being preferably colored red, white and blue. These lenses are disposed side by side so as to effect a series of vertical stripes. These lenses are also supported in the frame 158 by the clips 161.

The mirror construction as thus far described, without the addition of artificial lights located in rear thereof, will act as a plain mirror. When a light of predetermined candle power is positioned in rear of the mirror and lenses, said mirror will reflect and simultaneously the red, white and blue colors of the lenses will be visible. When an additional light is disposed in rear of the mirror and the lenses, the mirror will not give any reflection, and will be slightly transparent, the colors of the lenses, however, being visible. When, however, another light of further increased candle power is positioned in rear of the mirror and lenses, the mirror will be fully transparent and the colors of the lenses will still remain visible.

To this end, I have provided three sets of lamps 165, 165; 166, 166, and 167, 167. The lamps 165 are supported on the base 12 at the forward end thereof and adjacent the respective sides 5 and 6 of the casing. The lamps 166, 166 are also supported on the base 12 but at the rear thereof and adjacent the respective sides 5 and 6 of the casing. The lamps 167 are supported at the upper portion of the rear wall directly above the rear door 10 and respectively adjacent the sides 5 and 6. Associated with each lamp 167 is a reflector 168 for directing the light rays downwardly in rear of the respective mirrors. The rear wall of the casing is provided with a socket 169 for receiving a plug adapted to be connected to the usual electric light circuit. Electrical circuits for the respective lamps 165, 166 and 167 extend from the socket 169 and are respectively indicated at 170, 171 and 172. Disposed in the socket is a rotary switch 173 of any approved type. The circuit is normally open and upon rotation of the switch 173, the circuits 170, 171 and 172 will be automatically closed in succession. Thus the lamps 165 will be first illuminated and while these lamps are illuminated, the lamps 166 will be later illuminated, and while both lamps 165 and 166 remain illuminated the lamps 167 are also illuminated. The candle power of the lamps 166 is thereby added to the candle power of the lamps 165 and the candle power of the lamps 167 is added to the combined candle power of the lamps 165 and 166. Thus the lamps 165 produce a minimum light, the lamps 166 together with the lamps 165 an increased light, and the lamps 167 together with the lamps 165 and 166 produce a maximum light. The rotary switch 173 is shown generally in Figure 3, and is constantly rotated through the medium of a belt 174 from a pulley 175 fixed to the main shaft 20.

The constantly illuminated lamp 123 which is located in the display drum 116 receives its current through a circuit 176 which is connected to the circuit 170.

The alarm bell 153 and the switch 155 are located in a circuit 177 which is also connected to the circuit 177 and includes a transformer 178 for reducing the current an amount sufficient to properly operate the bell 153.

It is of course to be understood that the details of structure and arrangements of parts may be variously changed and modified without departing from the spirit and scope of my invention.

I claim:

1. In an envelope vending mechanism, the combination with a container for receiving a stack of envelopes and provided with an open top, a rearwardly and downwardly extending follower disposed within the container for raising the stack of envelopes, a vertically disposed lever pivoted at one side of the container and at a point in front thereof, a finger extending laterally from the upper end of the lever and movable by the lever across the open top of the container to eject the top envelope of the stack, the finger extending in a direction parallel with the pivot of the lever, and means for oscillating said lever and for moving the follower upwardly a distance equal to the thickness of an envelope of said stack.

2. In an envelope vending mechanism, the combination with a container for receiving a stack of envelopes, a rotatable table located in front of the container, means for ejecting the top envelope of the stack and depositing the same on the table, a follower for raising the stack, means for actuating the ejecting means, and means for simultaneously moving the follower upwardly and for rotating said table including a vertically disposed stationary tube, a screw mounted in said tube and having its upper end disposed below and connected to said follower, and means for moving the screw upwardly relative to said tube.

3. In an envelope vending mechanism, the combination with a casing, of a container having an open top and located within the casing for receiving a stack of envelopes, a horizontally disposed rotatable table located in front of the container and below the open top thereof, means for ejecting the top envelope of the stack and depositing the same onto said table, and a single means for actuating the ejecting means and for simultaneously rotating said table.

4. In an envelope vending mechanism, the combination with a casing having an opening, of a container having an open top and located within the casing in rear of said opening for receiving a stack of envelopes, a horizontally disposed rotatable table located in front of the container and below the open top thereof and projecting through the opening of the casing, means for ejecting the top envelope of the stack and depositing the same onto said table, and means for actuating the ejecting means and for simultaneously rotating said table.

5. In an envelope vending mechanism, the combination with a casing having an opening, of a container having an open top and located within the casing in rear of said opening for receiving a stack of envelopes, a horizontally disposed rotatable table located in front of the container and below the open top thereof and projecting through the opening of the casing, a follower for raising the stack, means for ejecting the top envelope of the stack and depositing the same onto said table, and means for actuating simultaneously the envelope ejecting means, for moving the follower upwardly a distance equal to the thickness of an envelope of said stack, and for rotating said table.

6. In an envelope vending mechanism, the combination with a casing having an opening, of a container having an open top and located within the casing in rear of said opening for receiving a stack of envelopes, a vertically disposed hollow standard fixedly mounted within the casing between the opening thereof and the container, a horizontally disposed table projecting through the opening of the casing and having a stem journaled in the hollow standard, a gear fixed to said stem, means for ejecting the top envelope of the stack and depositing the same onto said table, and means for actuating the ejecting means and for simultaneously rotating the table, said table rotating means including a driving gear meshing with the gear on said stem.

7. In an envelope vending mechanism, the combination with a casing, of a container located in the casing for receiving a stack of envelopes and provided with an open front, a follower for raising the stack, and means for operating the follower comprising a vertically disposed tube rigidly mounted on the casing in front of the container, a screw mounted in and projecting above said tube for vertical movements relative thereto, and an arm extending forwardly from the follower and having loose connection with the upper end of the screw, and means for rotating said screw in one direction whereby the follower will be moved upwardly.

In testimony whereof I hereunto affix my signature.

FRANCIS C. ROBERTS.